United States Patent
Mottini et al.

(10) Patent No.: US 9,695,959 B2
(45) Date of Patent: Jul. 4, 2017

(54) GUIDE SYSTEM AND METHOD FOR GUIDING A PIPELINE FROM A LAYING VESSEL ONTO THE BED OF A BODY OF WATER

(71) Applicant: SAIPEM S.p.A., San Donato Milanese (IT)

(72) Inventors: Mauro Mottini, Travaco' Siccomario (IT); Flavio Piccio, Milan (IT)

(73) Assignee: SAIPEM S.P.A., San Donato Milanese (IT)

( * ) Notice: Subject to any disclaimer, the term of this patent is extended or adjusted under 35 U.S.C. 154(b) by 149 days.

(21) Appl. No.: 14/402,588

(22) PCT Filed: Jun. 14, 2013

(86) PCT No.: PCT/IB2013/054894
§ 371 (c)(1),
(2) Date: Nov. 20, 2014

(87) PCT Pub. No.: WO2013/186758
PCT Pub. Date: Dec. 19, 2013

(65) Prior Publication Data
US 2015/0152978 A1    Jun. 4, 2015

(30) Foreign Application Priority Data

Jun. 14, 2012    (IT) .............................. MI2012A1036

(51) Int. Cl.
F16L 1/235    (2006.01)
F16L 1/24    (2006.01)
F16L 1/18    (2006.01)

(52) U.S. Cl.
CPC .. F16L 1/24 (2013.01); F16L 1/18 (2013.01)

(58) Field of Classification Search
CPC ..... F16L 1/235; F16L 1/20; F16L 1/24; F16L 1/18
(Continued)

(56) References Cited

U.S. PATENT DOCUMENTS 2,910,835 A * 11/1959 Timothy ................. B63B 35/03
119/422
3,280,571 A    10/1966 Hauber et al.
(Continued)

FOREIGN PATENT DOCUMENTS

WO    WO2008/149210    12/2008
WO    WO2009/098586    8/2009
(Continued)

OTHER PUBLICATIONS

International Search Report and Written Opinion for International Application No. PCT/IB2013/054894 dated Sep. 25, 2013.
(Continued)

*Primary Examiner* — Sunil Singh
(74) *Attorney, Agent, or Firm* — Neal, Gerber & Eisenberg LLP

(57) ABSTRACT

A guide system configured to guide a pipeline from a laying vessel onto the bed of a body of water has a float unit; a trolley, which is housed inside the frame, is selectively connectable to a pipeline spanning a given or designated path between the laying vessel and the bed of the body of water, and is configured to roll along the pipeline, parallel to the given or designated path; and at least one motor connected to the trolley) to selectively adjust the distance between the float unit and the laying vessel.

24 Claims, 9 Drawing Sheets

(58) Field of Classification Search
USPC .......................... 405/166, 168.1, 171, 184.4
See application file for complete search history.

(56) References Cited

U.S. PATENT DOCUMENTS

| | | | |
|---|---|---|---|
| 3,487,648 A | 1/1970 | Benton | |
| 3,507,126 A | 4/1970 | Rochelle et al. | |
| 3,538,712 A | 11/1970 | Lochridge et al. | |
| 3,566,609 A * | 3/1971 | Smith | B63B 35/03 |
| | | | 405/167 |
| 3,606,759 A | 9/1971 | Lochridge | |
| 3,670,511 A | 6/1972 | Gibson et al. | |
| 3,835,707 A * | 9/1974 | Rosa | F16L 1/235 |
| | | | 405/166 |
| 3,935,822 A * | 2/1976 | Kaufmann | B61C 13/04 |
| | | | 104/109 |
| 4,015,435 A * | 4/1977 | Shaw | F16L 1/18 |
| | | | 405/166 |
| 4,030,311 A | 6/1977 | Rafferty | |
| 4,121,529 A * | 10/1978 | Smith | F16L 1/163 |
| | | | 114/267 |
| 4,127,006 A | 11/1978 | Oosterkamp | |
| 4,257,718 A | 3/1981 | Rosa et al. | |
| 5,222,439 A * | 6/1993 | Di Rosa | B61C 13/04 |
| | | | 104/93 |

FOREIGN PATENT DOCUMENTS

| | | |
|---|---|---|
| WO | WO2010/122395 | 10/2010 |
| WO | WO2011/077238 | 6/2011 |

OTHER PUBLICATIONS

Notification Concerning Submission, Obtention or Transmittal of Priority Document (Form PCT/IB/304) for International Application No. PCT/IB2013/054894 dated Oct. 11, 2013.

* cited by examiner

GUIDE SYSTEM AND METHOD FOR GUIDING A PIPELINE FROM A LAYING VESSEL ONTO THE BED OF A BODY OF WATER

PRIORITY CLAIM

This application is a national stage application of PCT/IB2013/054894, filed on Jun. 14, 2013, which claims the benefit of and priority to Italian Patent Application No. MI2012A001036, filed on Jun. 14, 2012, the entire contents of which are each incorporated by reference herein.

BACKGROUND

A guide system for laying a pipeline in a body of water normally comprises a laying ramp, which comprises a frame hinged to the stern of a laying vessel to rotate about an axis of rotation, and at least one supporting device fitted to the frame to support the pipeline in a given configuration.

A laying vessel for laying a pipeline on the bed of a body of water normally comprises a floating body, which in turn comprises a pipeline assembly line, and is connected at the stern to the laying ramp, which defines an extension of the assembly line to lay the pipeline gradually onto the bed of the body of water as the laying vessel moves forward.

In the work configuration, the laying ramp serves to support the pipeline along a path extending partly above and partly below water level. Between the laying vessel and the bed, the pipeline assumes an S-shaped configuration, the radius of curvature of the two curves of which depends on the characteristics of the pipeline, the length and configuration of the laying ramp, and the depth of the body of water. Pipeline laying vessels include pontoons, barges, semisubmersibles and single-hull ships, and are selected according to the depth of the bed, prevailing weather conditions, and the type of project. Pontoons and barges are the vessels most commonly used for laying pipelines in shallow water. The laying ramp is connected to the laying vessel by an actuating assembly known, for example, U.S. Pat. No. 4,257,718; PCT Patent Application No. WO 2008/149210; and PCT Patent Application No. WO 2009/098586 filed by the present Applicant. In the above documents, the second portion of the frame is fitted to and projects from arms connected to the laying vessel.

Given their size and structural design, the laying ramps and vessels described in U.S. Pat. No. 4,257,718; PCT Patent Application No. WO 2008/149210; and PCT Patent Application No. WO 2009/098586 are unsuitable for laying pipelines in shallow water, and particularly on beds of varying topography. More specifically, laying pipelines in shallow water calls for the use of vessels with a very small draught.

The weight of the pipeline and laying ramp may also pose stability problems, which are solved by supporting the free end of the laying ramp with variable-buoyancy floats, as described, for example, in U.S. Pat. No. 4,030,311; U.S. Pat. No. 3,670,511; U.S. Pat. No. 3,606,759; U.S. Pat. No. 3,538,712; and U.S. Pat. No. 3,507,126.

The laying ramp described in these documents, however, is unsuitable for use in very shallow water with a bed of varying topography. That is, laying pipelines in water of an average depth of around 4 meters, with a bed varying topographically between 1.5 and 20 meters, would require relatively very large controlled-buoyancy tanks, and, apart from their size and weight, operation of the tanks to adjust their depth would be incompatible with other pipeline laying operations.

Another known drawback lies in the pipeline, in shallow water, forming two opposite curves along a relatively short length of the pipeline. And all the above drawbacks are further aggravated as the specific weight of the pipeline increases.

U.S. Pat. No. 3,280,571 describes a laying ramp comprising sledges fitted to the free end of the ramp and designed to rest on the bed of the body of water.

Though partly solving certain of the above drawbacks, the laying ramp described in U.S. Pat. No. 3,280,571 is only suitable for use on certain types of beds, and cannot be moved in the opposite to laying direction without running the risk of the sledges becoming bogged down and moving the laying ramp out of line with respect to the laying vessel.

One technical solution proposed by the Applicant in PCT Patent Application No. WO 2011/077238 includes supporting the free end of the laying ramp on a powered trolley designed to move along the bed of the body of water. In this case, however, the angle of the laying ramp with respect to the laying vessel is substantially defined by the topography of the bed of the body of water. As such, the angles formed between the laying vessel, the laying ramp and the bed vary alongside variations in the topography of the bed, and may become critical enough to endanger the integrity of the pipeline as depth increases.

A guide system for supporting a pipeline span and alternative or complementary to the laying ramp comprises at least one variable-buoyancy unit designed to fit to and support the pipeline. An example of a float unit for supporting a pipeline as pipeline is laid inside a trench is described in PCT Patent Application No. WO 2010/122395, which describes a post-trenching method (i.e., a method in which an excavator digs a trench under the pipeline lying on the bed of the body of water, and draws along at least one float unit connectable to the pipeline span to prevent it from overbending).

Another example of a float unit is described in U.S. Pat. No. 4,127,006 and relates to laying a pipeline in deep water from a laying vessel. In this document, the float unit moves along the pipeline by varying its buoyancy and its grip on the pipeline.

Neither of the above proposed solutions provides for effective guidance in shallow water of varying topography, in which the float unit has to move rapidly into the best position to support the pipeline span without slowing down the laying work.

SUMMARY

The present disclosure relates to a guide system configured to guide a pipeline from a laying vessel onto the bed of a body of water, in particular in shallow water.

One advantage of the present disclosure is to provide a guide system configured to eliminate certain of the drawbacks of certain of the known art.

According to the present disclosure, there is provided a guide system configured to guide a pipeline from a laying vessel onto the bed of a body of water, the guide system comprising a float unit; a trolley, which is selectively connectable to a pipeline spanning a given or designated path between the laying vessel and the bed of the body of water, and is configured to roll along the pipeline, parallel to the given or designated path, to adjust the position of the float unit along the pipeline; and at least one motor connected to the trolley to adjust the distance between the float unit and the laying vessel.

The present disclosure makes it possible to adjust the position of the float unit with respect to the laying vessel rapidly according to the depth of the bed of the body of water, and to set the float unit to the relative best position, with respect to the bed and to the laying vessel, to effectively support the pipeline.

In certain embodiments of the present disclosure, the trolley comprises powered rollers configured to contact the pipeline; and a first, reversible, motor configured to drive the powered rollers to adjust the distance between the float unit and the laying vessel.

In this way, the powered float unit is able to move rapidly and accurately in opposite directions along the pipeline.

In certain embodiments of the present disclosure, the guide system comprises a drive on board the laying vessel and in turn comprising a winch connected by a cable to the trolley, and a second motor configured to drive the winch to adjust the distance between the float unit and the laying vessel.

This embodiment makes it possible to haul the float unit back rapidly towards the laying vessel.

In certain embodiments of the present disclosure, the frame defines a compartment configured to house the trolley and the pipeline; and at least two seats configured to house floats and located on opposite sides of said compartment.

This embodiment reduces the sail effect and improves the stability of the float unit, and makes it possible to operate in relatively very shallow water.

In a further embodiment of the present disclosure, the frame is configured to rest stably on the bed of the body of water.

In this way, the float unit is able to connect and disconnect the trolley to and from the pipeline, even when the frame is resting on the bed of the body of water.

In certain embodiments of the present disclosure, the trolley comprises a brake which acts on the pipeline. In these embodiments, the brake comprises pads configured to grip the pipeline.

The brake assists in defining the exact position of the float unit with respect to the laying vessel and the bed of the body of water.

In certain embodiments of the present disclosure, the trolley comprises guide rollers configured to roll along the top of the pipeline.

In other words, the trolley is configured to rest on the pipeline.

In addition, the guide rollers are movable selectively with respect to the frame, depending on the diameter of the pipeline.

This adjustable embodiment makes it possible to adapt the float unit to work with pipelines of different diameters.

In certain embodiments of the present disclosure, the trolley comprises grip rollers configured to roll along the bottom of the pipeline, and which are movable selectively between a release position, in which the pipeline is insertable between the grip rollers, and a closed position, in which the grip rollers are positioned contacting the pipeline.

In this embodiment, the grip rollers transfer the thrust produced by the floats to the pipeline.

In certain embodiments of the present disclosure, the grip rollers and respective arms are articulated, so as to remain within the confines of the frame, regardless of the position of the grip rollers.

This configuration of the grip rollers makes it possible for the grip rollers to operate even when the frame is positioned resting, for example, on the bed of the body of water.

More specifically, each grip roller has a truncated-cone-shaped outer surface, and rotates with respect to the respective arm about an axis; and the respective arm rotates selectively with respect to the frame about a further axis parallel to said axis.

This configuration makes it possible to maneuver the grip roller and respective arm in the same plane, without altering the angle of the outer surface of the roller.

In certain embodiments of the present disclosure, the trolley comprises a further frame connectable selectively to the pipeline and the frame.

This makes the assembly as a whole relatively easier to handle, even using low-power cranes normally installed on shallow-draught barges.

In certain embodiments, the further frame supports a plurality of powered rollers divided into a plurality of sets of aligned powered rollers; said sets of powered rollers being configured to fit around the pipeline.

The powered rollers thus also act as grip rollers to ensure a relative safe, even distributed grip along the pipeline.

In certain embodiments of the present disclosure, the further frame comprises actuators configured to produce a relative movement between the sets of powered rollers to selectively grip and release the pipeline.

The actuators also enable a certain amount of position adjustment to adapt the trolley to pipelines of different diameters.

In certain embodiments of the present disclosure, the frame and the further frame comprise respective connecting members configured to selectively connect the frame to the further frame.

This characteristic makes it possible to fit the trolley first to the pipeline, and then the float unit to the trolley.

Another advantage of the present disclosure is to provide a method of guiding a pipeline from a laying vessel onto the bed of a body of water.

According to the present disclosure, there is provided a method of guiding a pipeline from a laying vessel onto the bed of a body of water, the method comprising the steps of selectively fitting a trolley of a float unit to a pipeline spanning a given or designated path between the laying vessel and the bed of the body of water; and moving the trolley, parallel to the given or designated path, along the pipeline utilizing at least one motor connected to the trolley, to adjust the distance between the float unit and the laying vessel.

This provides for a relative high degree of response in positioning the float unit along the pipeline, and for adapting support of the pipeline by the float unit according to the topography of the bed of the body of water.

In certain embodiments of the present disclosure, the method comprises adjusting the trolley according to the size of the pipeline.

In this way, one unit can be adapted to different diameters.

In certain embodiments of the present disclosure, the trolley comprises grip rollers fitted to a frame; the method comprising the steps of moving the grip rollers between a release position and a closed position within the confines of the frame of the float unit.

This makes it possible to operate the grip rollers even when the frame is positioned resting, for example, on the bed of the body of water.

In certain embodiments of the present disclosure, the method comprises fitting the trolley to the pipeline, and then fitting the float unit to the trolley.

This reduces the weight to be maneuvered on a shallow-draught laying vessel.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which.

DETAILED DESCRIPTION

Figure 1:
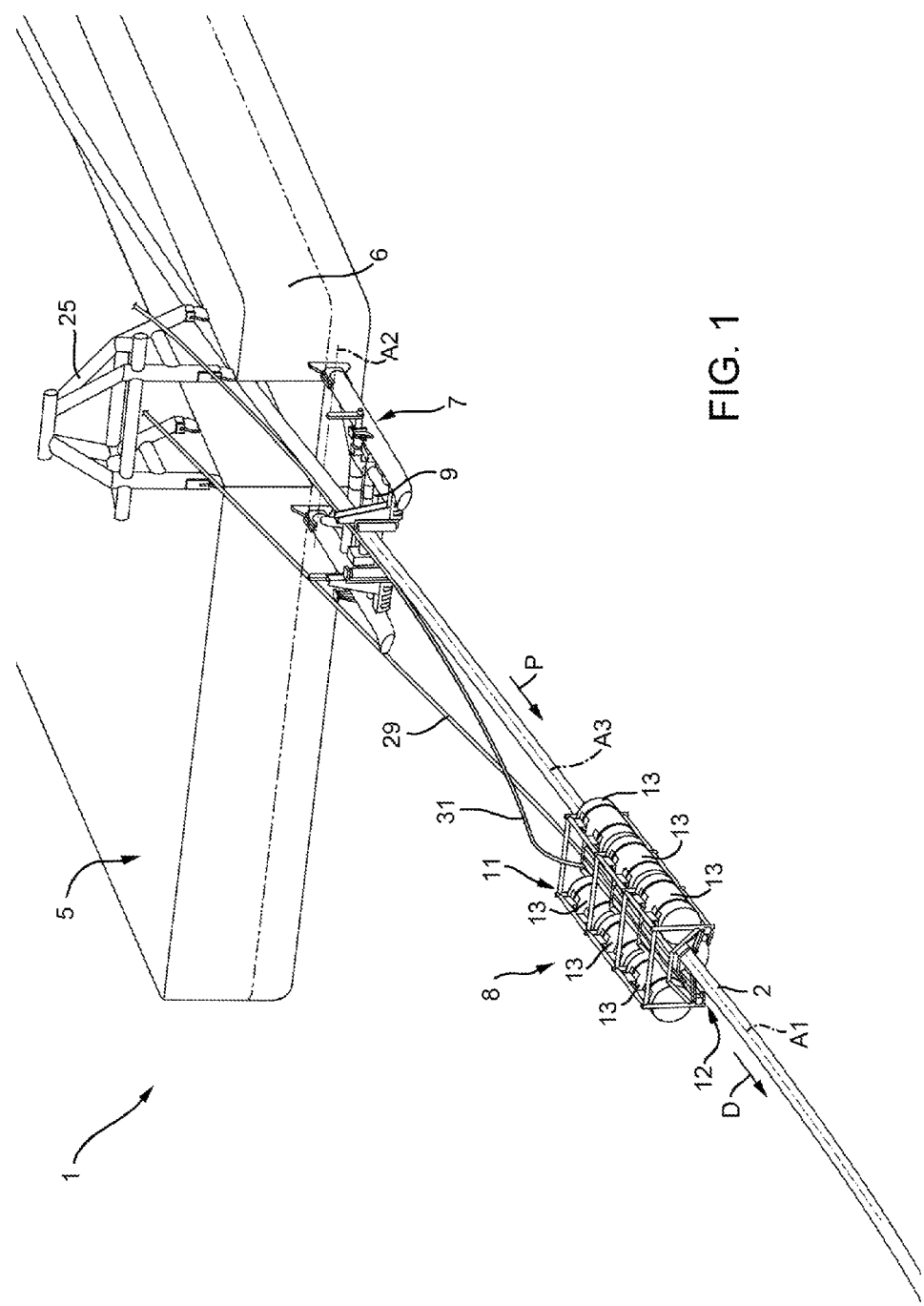
FIG. 1 shows a view in perspective, with parts removed for clarity, of a guide system in accordance with the present disclosure.
Figure 2:
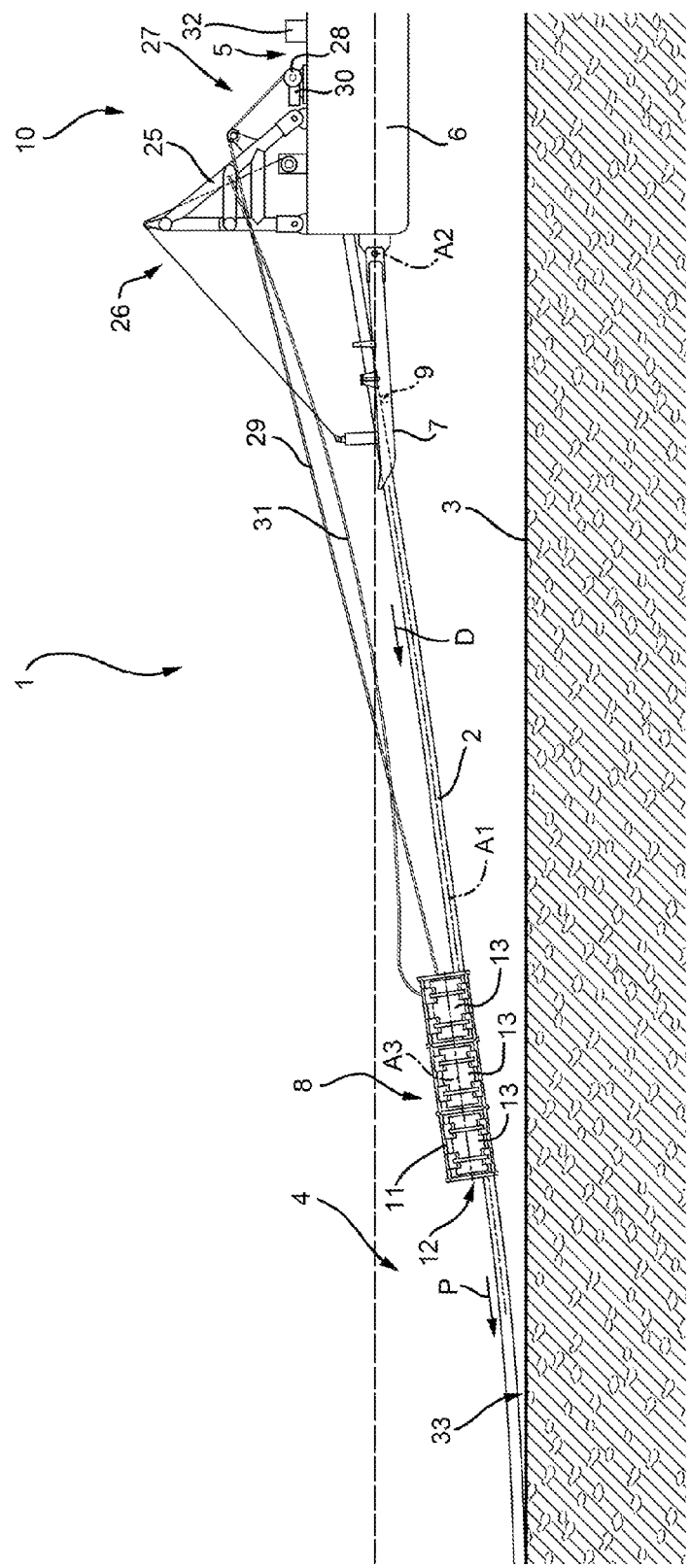
FIG. 2 shows a side view, with parts removed for clarity, of the FIG. 1 guide system.

Referring now to the example embodiments of the present disclosure illustrated in FIGS. 1 to 11, number 1 in FIG. 1 indicates as a whole a guide system configured to guide a pipeline 2 onto the bed 3 of a body of water 4 (FIG. 2).

In the example shown, guide system 1 is connected to a laying vessel 5, which is, in this example embodiment, defined by a barge and comprises a shallow-draught hull 6 configured to operate in very shallow water; and an assembly line (not shown in the drawings) configured to assemble pipeline 2. In other words, when laying pipeline 2, pipeline 2 is fed in a feed direction D along a given or designated path P with respect to laying vessel 5. Guide system 1 comprises a laying ramp 7; and at least one float unit 8 connectable selectively to the pipeline 2 span between laying vessel 5 and bed 3 of body of water 4, downstream from laying ramp 7 in the feed direction D of pipeline 2 with respect to laying ramp 7. Laying ramp 7 comprises a supporting device 9 which, in use, is positioned contacting pipeline 2; and float unit 8 defines a support configured to support pipeline 2, and which is movable selectively along pipeline 2 and with respect to laying vessel 5.

With reference to FIG. 2, pipeline 2 has a longitudinal axis A1 and, as pipeline is being laid, assumes a roughly 'S' shape. Laying ramp 7 extends predominantly in direction D, and is hinged to the stern of laying vessel 5 to rotate about an axis A2 perpendicular to direction D. Guide system 1 also comprises a drive 10 located at the stern of laying vessel 5 to control laying ramp 7, and in particular to control the angle of laying ramp 7 about axis A2.

Figure 3:
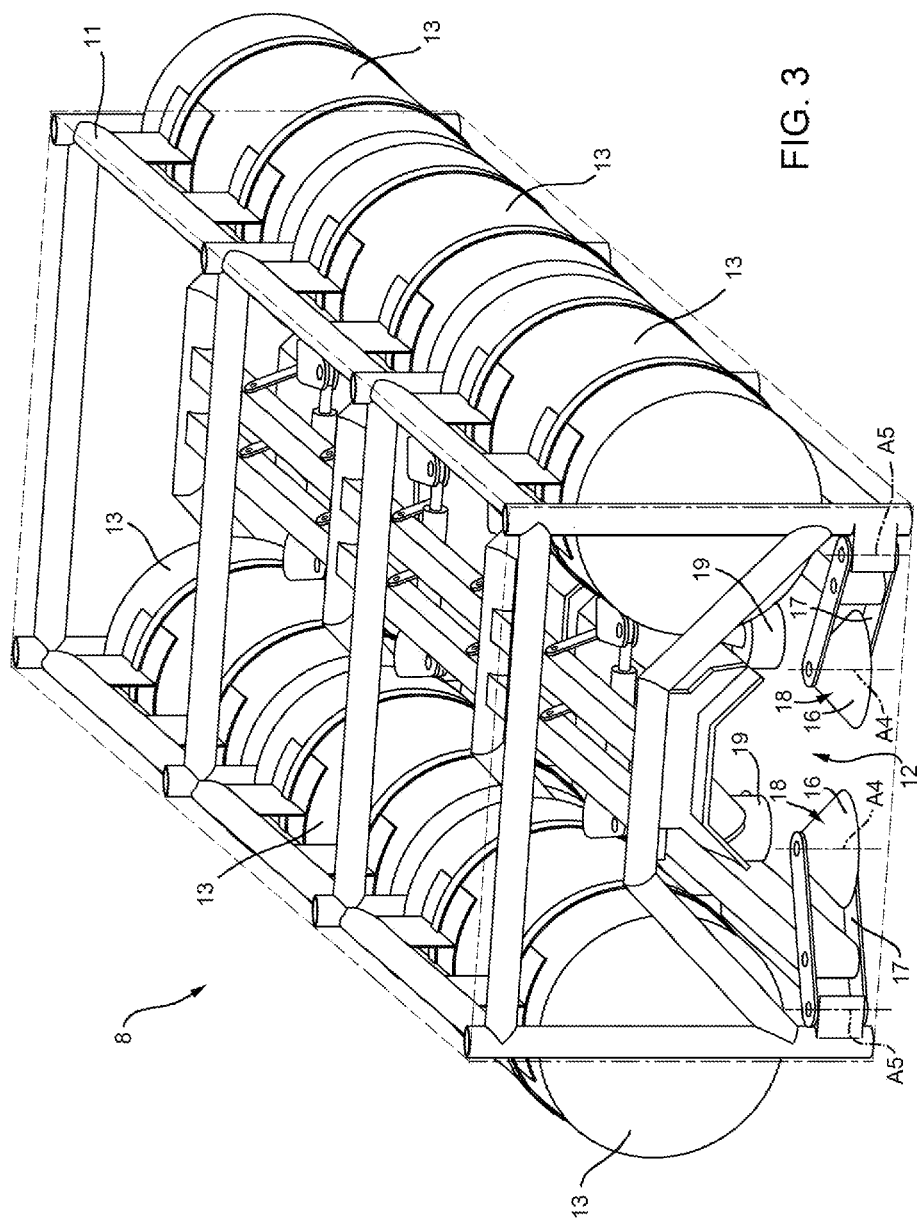
FIG. 3 shows an enlarged view in perspective, with parts removed for clarity, of a float unit of the FIG. 1 guide system.
Figure 4:
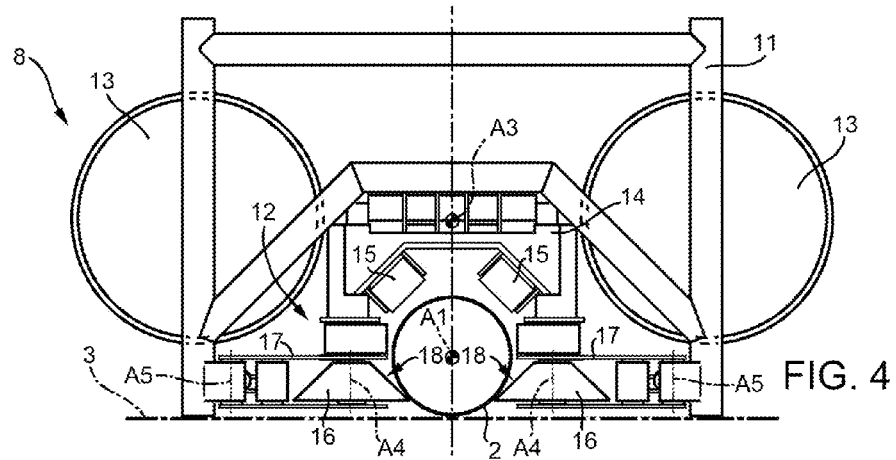
FIGS. 4 to 6 show front views, with parts removed for clarity, of the FIG. 3 float unit in different operating positions.
Figure 5:
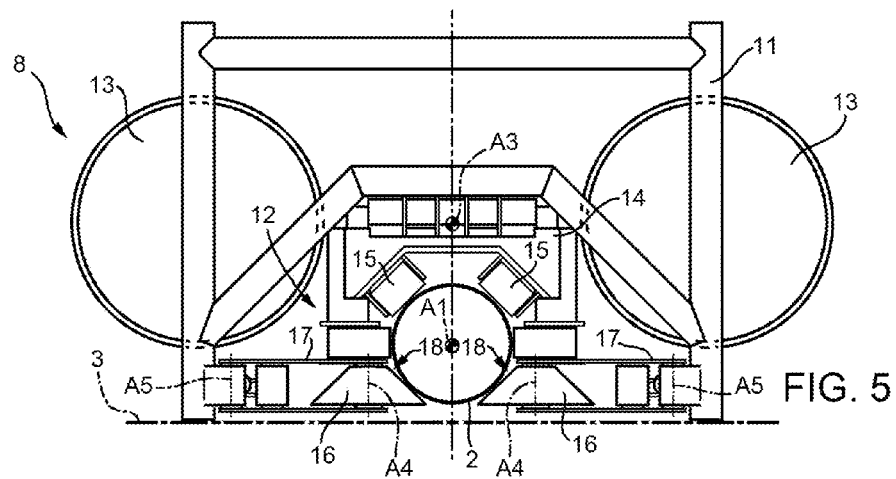
Figure 6:
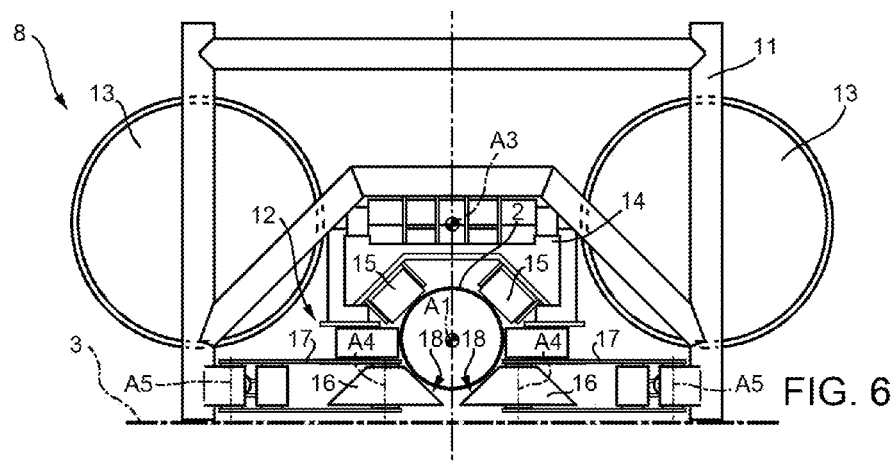

As shown in FIG. 3, float unit 8 comprises a frame 11, and is fitted stably to a trolley 12. Float unit 8 comprises a plurality of floats 13, some of variable buoyancy. Frame 11 is defined by a metal structure of welded tubes, and is roughly in the shape of a parallelepiped extending predominantly along a longitudinal axis A3 (FIG. 4). Frame 11 is configured to rest firmly on a surface, such as bed 3 of body of water 4 (FIGS. 4 to 6). Frame 11 has a compartment, which extends along longitudinal axis A3, is accessible from the underside of frame 11, and is configured to house trolley 12 and pipeline 2 (FIGS. 4 to 6). Frame 11 has a plurality of seats located on opposite sides of the compartment and along axis A3, and configured to house floats 13.

With reference to FIGS. 4 to 6, trolley 12 comprises a top structure 14 fitted in selectively movable manner to frame 11, crosswise to longitudinal axis A3; and two sets of downward-facing guide rollers 15 fitted to top structure 14 and configured to roll along the top of pipeline 2. The guide rollers 15 in each set are aligned parallel to longitudinal axis A3, and have a substantially cylindrical outer surface.

Figure 7:
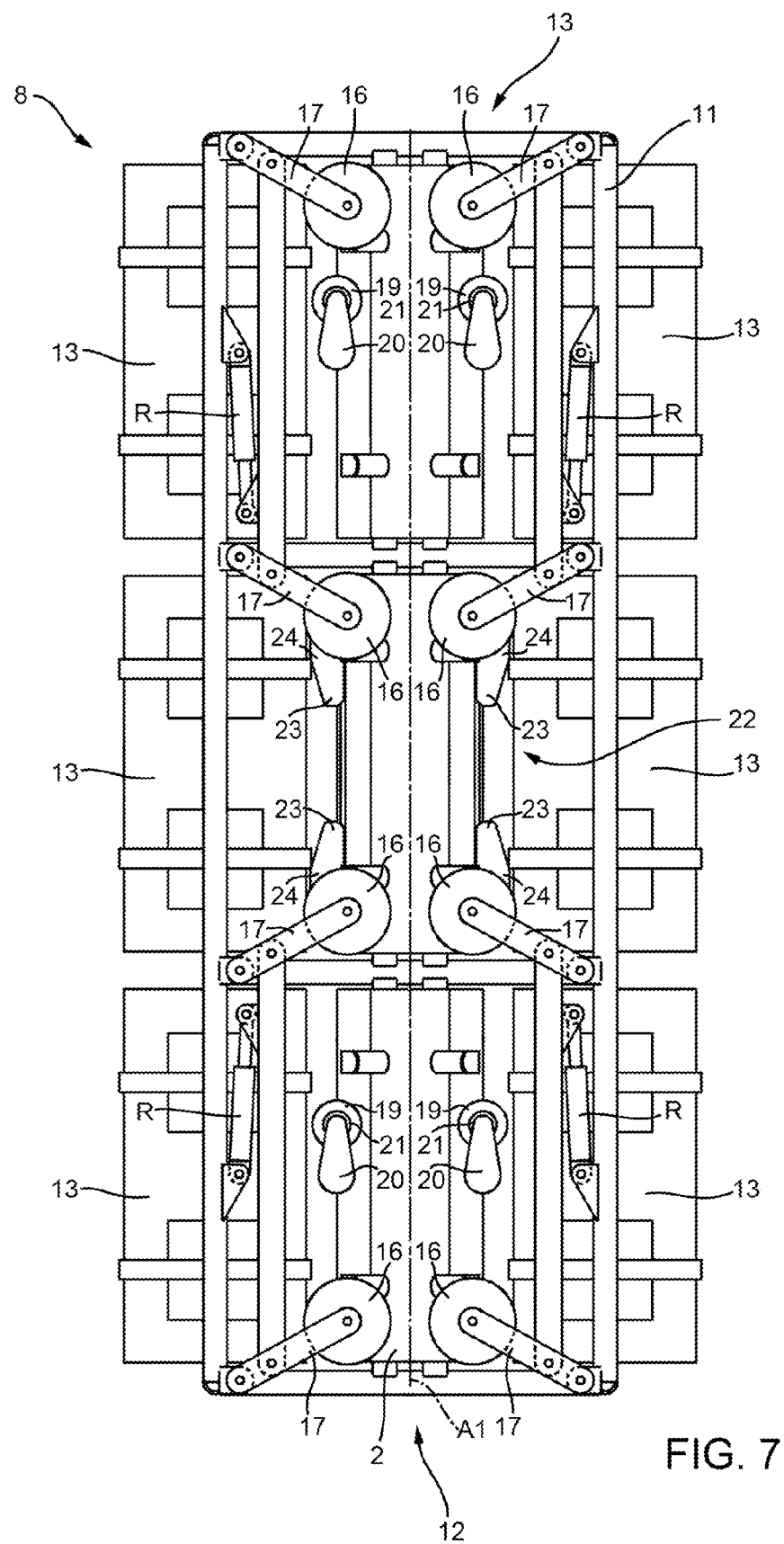
FIG. 7 shows a plan view, with parts removed for clarity, of the FIG. 4 float unit.

Trolley 12 comprises two sets of grip rollers 16 configured to roll along the bottom of pipeline 2. Each set of grip rollers 16 is located inside and on opposite sides of the compartment in frame 11. Each grip roller 16 is fitted to an arm 17, which is hinged to frame 11 and movable selectively between a release position and a closed position by an actuator R (FIG. 7). Each arm 17 is hinged to frame 11 so that both grip roller 16 and arm 17 itself remain within the confines of frame 11 throughout the travel of grip roller 16 between the closed and release positions. Each grip roller 16 has a truncated-cone-shaped outer surface 18 to better support pipeline 2.

Each grip roller 16 is mounted to rotate about an axis A4; and respective arm 17 is hinged to frame 11 about an axis A5 parallel to axis A4.

The design or configuration of arms 17 and grip rollers 16 enable them to grip and release pipeline 2 without interfering with bed 3 of body of water 4, even when pipeline 2 and float unit 8 are positioned resting on bed 3 of body of water 4, as shown in FIGS. 4 and 5.

With reference to FIG. 6, top structure 14 is movable selectively with respect to frame 11, to move guide rollers 15 selectively to and from grip rollers 16 to adapt trolley 12 to pipelines of different diameters. In FIG. 6, for example, float unit 8 is shown engaging a pipeline smaller in diameter than pipeline 2 in FIGS. 4 and 5.

With reference to FIG. 7, trolley 12 comprises powered rollers 19 fitted to movable arms 20 hinged to frame 11. In various embodiments, powered rollers 19 are driven by respective, hydraulic or pneumatic, motors 21 to move float unit 8 selectively along pipeline 2. Arms 20 are operated selectively, by actuators (not shown in the drawings), to move powered rollers 19 selectively into contact with pipeline 2.

Trolley 12 also comprises a brake 22, in turn comprising pads 23 configured to selectively engage pipeline 2. In the example shown, each pad 23 is fitted to an arm 24 movable with respect to frame 11 and operated by an actuator (not shown in the drawings).

Each float 13 is fixed inside a respective seat in frame 11, is cylindrical in shape, and projects both outwards of frame 11 and into the compartment housing trolley 12.

With reference to FIG. 2, drive 10 comprises a gantry structure 25, which at least partly supports a lifting device 26 configured to raise laying ramp 7 and substantially configured to rotate laying ramp 7 about axis A2; and a pulling device 27 connectable to float unit 8.

In the example shown, pulling device 27 comprises a winch 28; a cable 29 operated by winch 28 and connectable to float unit 8; and a motor 30 configured to drive winch 28.

Drive 10 also comprises an umbilical 31 configured to transfer power and commands to motors 21, to the actuators (not shown in the drawings) to position guide rollers 15, grip rollers 16, powered rollers 19 and pads 23, and to variable-buoyancy floats 13. Drive 10 comprises a control unit 32 configured to monitor and control operation of laying ramp 7 and float unit 8.

In actual use, as pipeline 2 is launched from laying vessel 5, pipeline may be guided and supported solely by laying ramp 7 and/or by one or more float units 8 fitted to pipeline 2, depending on the span, weight and stiffness of pipeline 2.

As shown more clearly in FIG. 2, when laying on a topographically even bed 3 of body of water 4, the distance between float unit 8 and laying vessel 5, and between float unit 8 and the touchdown point 33 of pipeline 2 on bed 3 is maintained constant by winch 28. That is, winch 28 maintains a constant length of cable 29, so that float unit 8 rolls along pipeline 2 as laying vessel 5 moves forward.

When laying on a bed 3 of body of water 4, which varies topographically along the laying path, the distance between float unit 8 and laying vessel 5, and between float unit 8 and touchdown point 33 is adjusted, because of the change in length in the span of pipeline 2. Float unit 8 is moved with respect to laying vessel 5 utilizing powered rollers 19 and motors 21 (FIG. 7) and/or winch 28, cable 29, and motor 30 (FIG. 2).

In addition to rapid response in moving along pipeline 2, float unit 8 also has the advantage of being connectable to pipeline 2 even when pipeline 2 is lying on bed 3 of body of water 4. More specifically, frame 11 is configured to rest on bed 3 of body of water 4; and grip rollers 16, being truncated-cone-shaped and moving parallel to bed 3, make it possible to grip pipeline 2 lying on bed 3, without interfering with bed 3, as shown in FIGS. 4 and 5. Float unit 8 is able to release pipeline 2 gradually onto bed 3 when frame 11 is positioned resting on bed 3.

Figure 8:
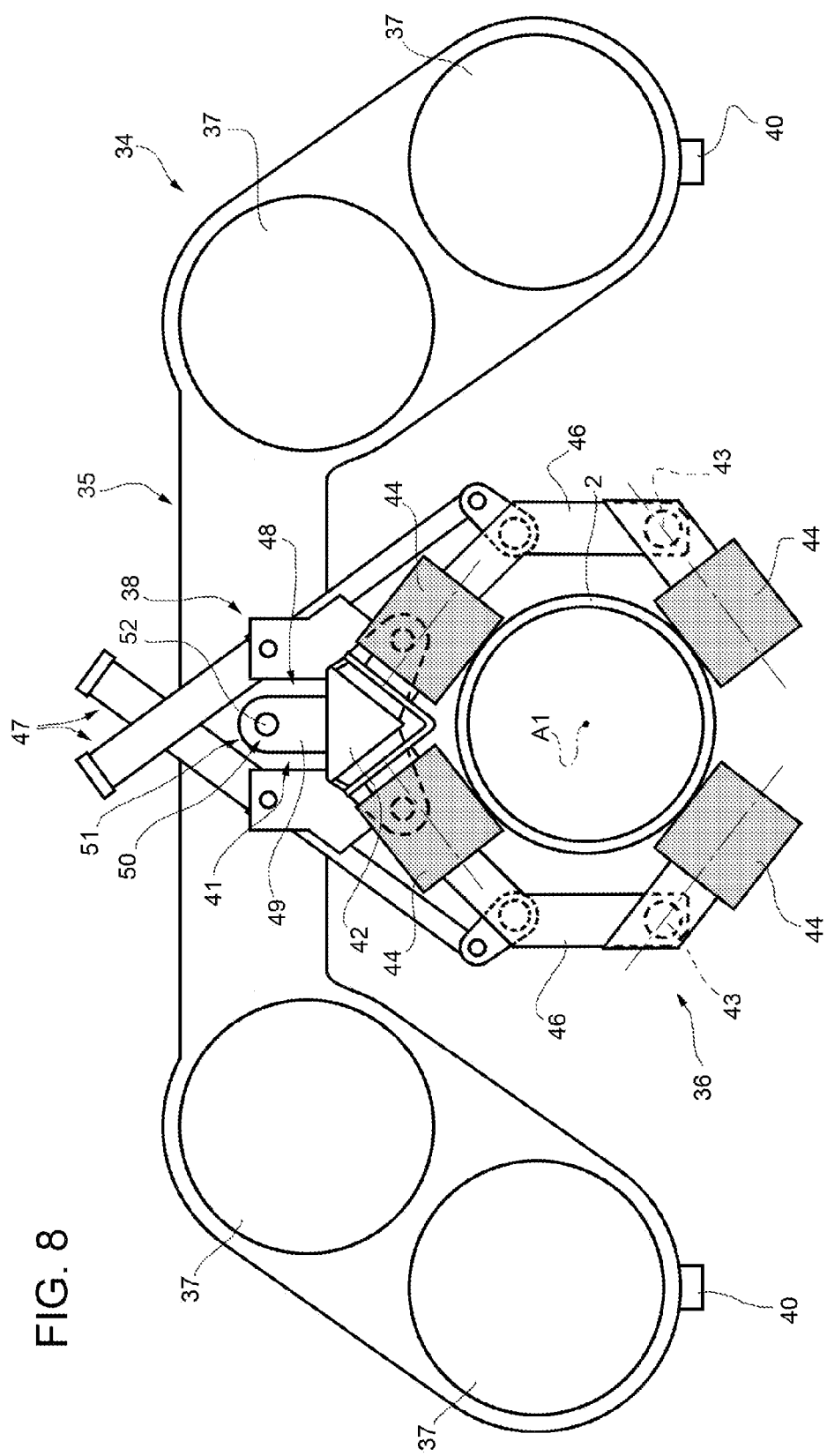
FIG. 8 shows a front view, with parts removed for clarity, of an alternative embodiment of the guide system according to the present disclosure.

Number 34 in the FIG. 8 embodiment indicates a float unit comprising a frame 35; and a trolley 36 connectable selectively to float unit 34. Float unit 34 comprises a plurality of floats 37, some of variable buoyancy, fitted to frame 35. Float unit 34 differs from the FIGS. 1 to 7 float unit mainly by trolley 36 being connectable selectively to frame 35 and having a frame 38 of its own.

Figure 9:
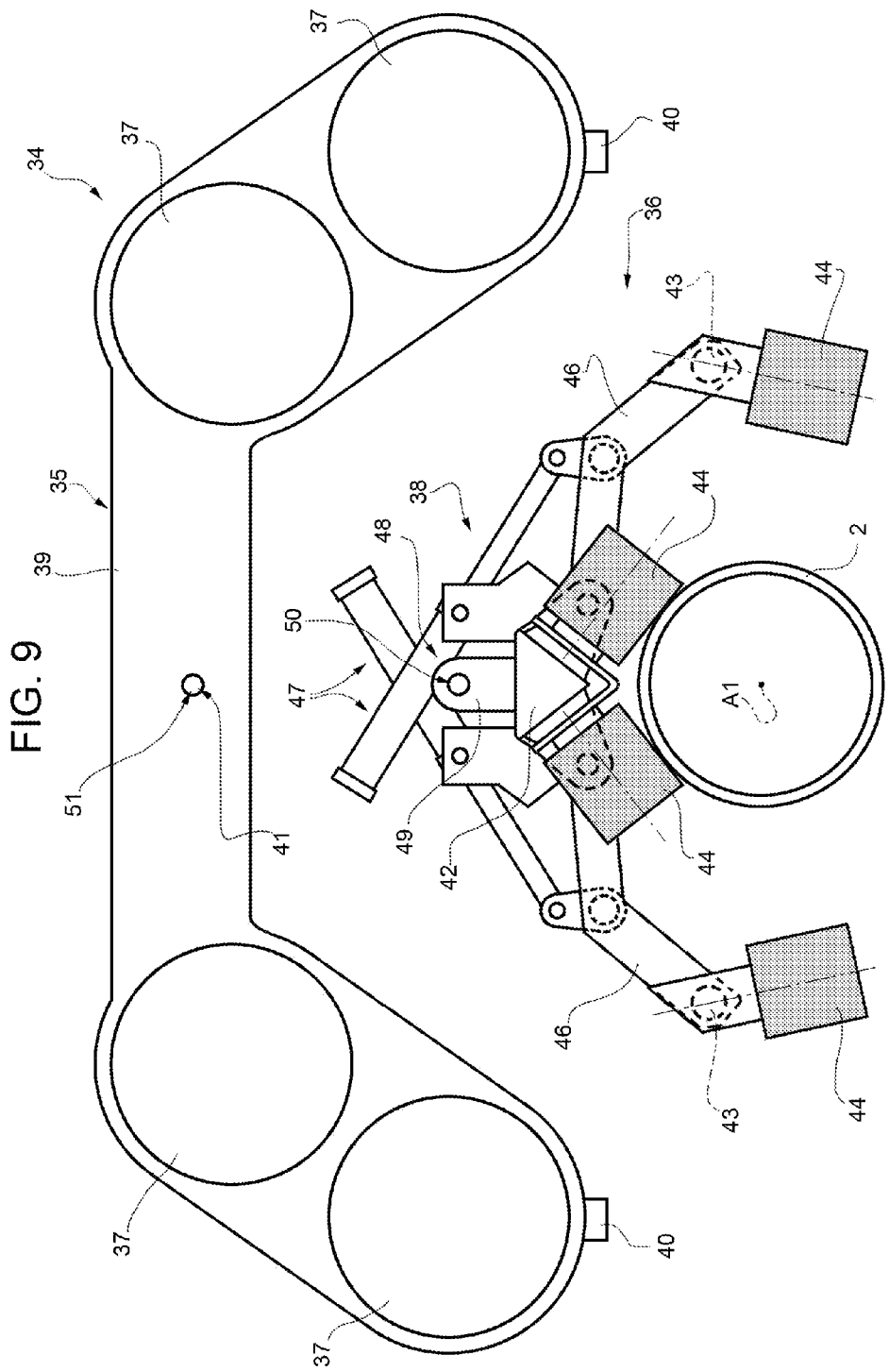
FIG. 9 shows a front view, with parts removed for clarity, of the FIG. 8 guide system.
Figure 11:
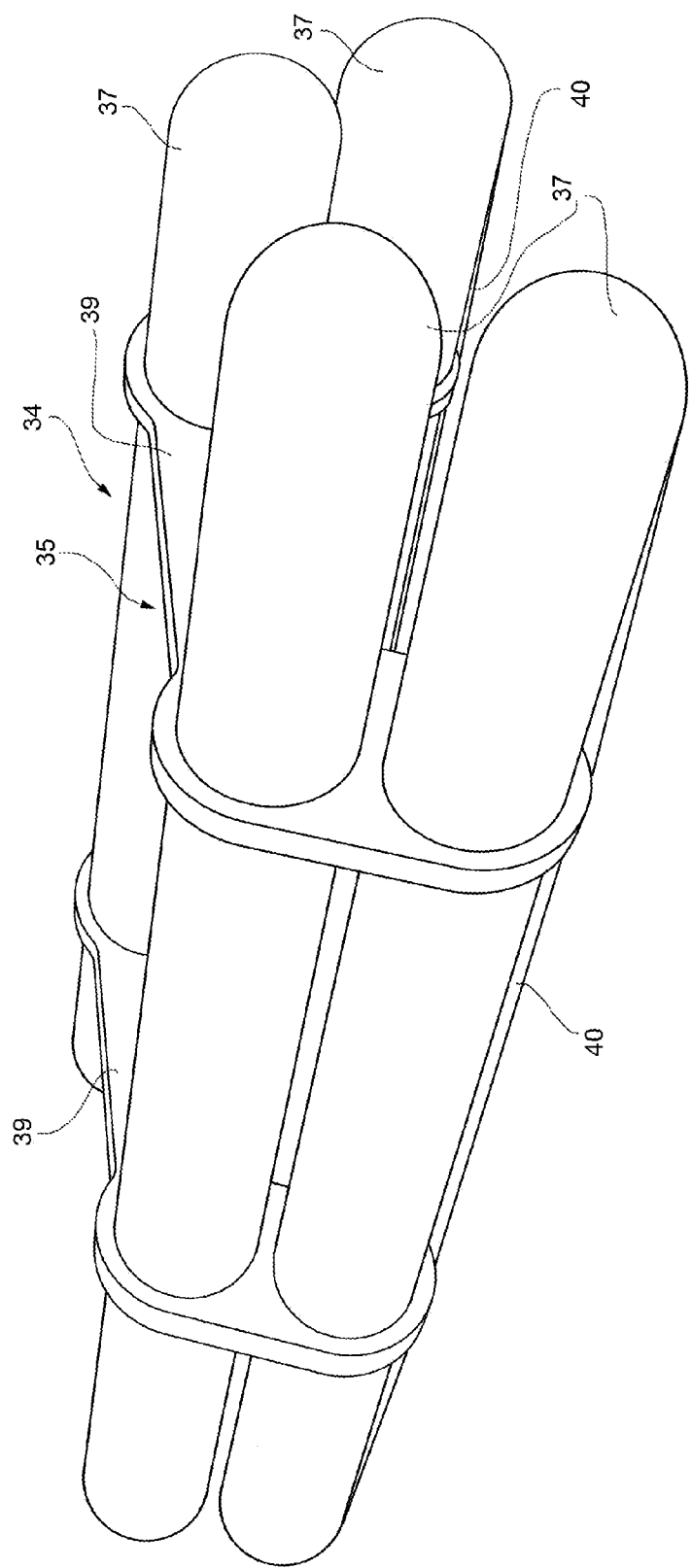
FIG. 11 shows a view in perspective, with parts removed for clarity, of the float unit.

More specifically, and with reference to FIG. 11, frame 35 of float unit 34 comprises two facing, curved plates 39 connected by beams 40. Plates 39 have openings defining seats configured to house floats 37, which in this case comprise elongated cylindrical containers. Plates 39 also have connecting members 41, as shown in FIG. 9. Frame 35 is configured to rest firmly on a surface utilizing beams 40. Frame 35 has a compartment accessible from the underside of frame 35 and configured to house trolley 36 and pipeline 2, in the same way as shown in FIGS. 4 to 6; and floats 37 are substantially located on opposite sides of the compartment.

Figure 10:
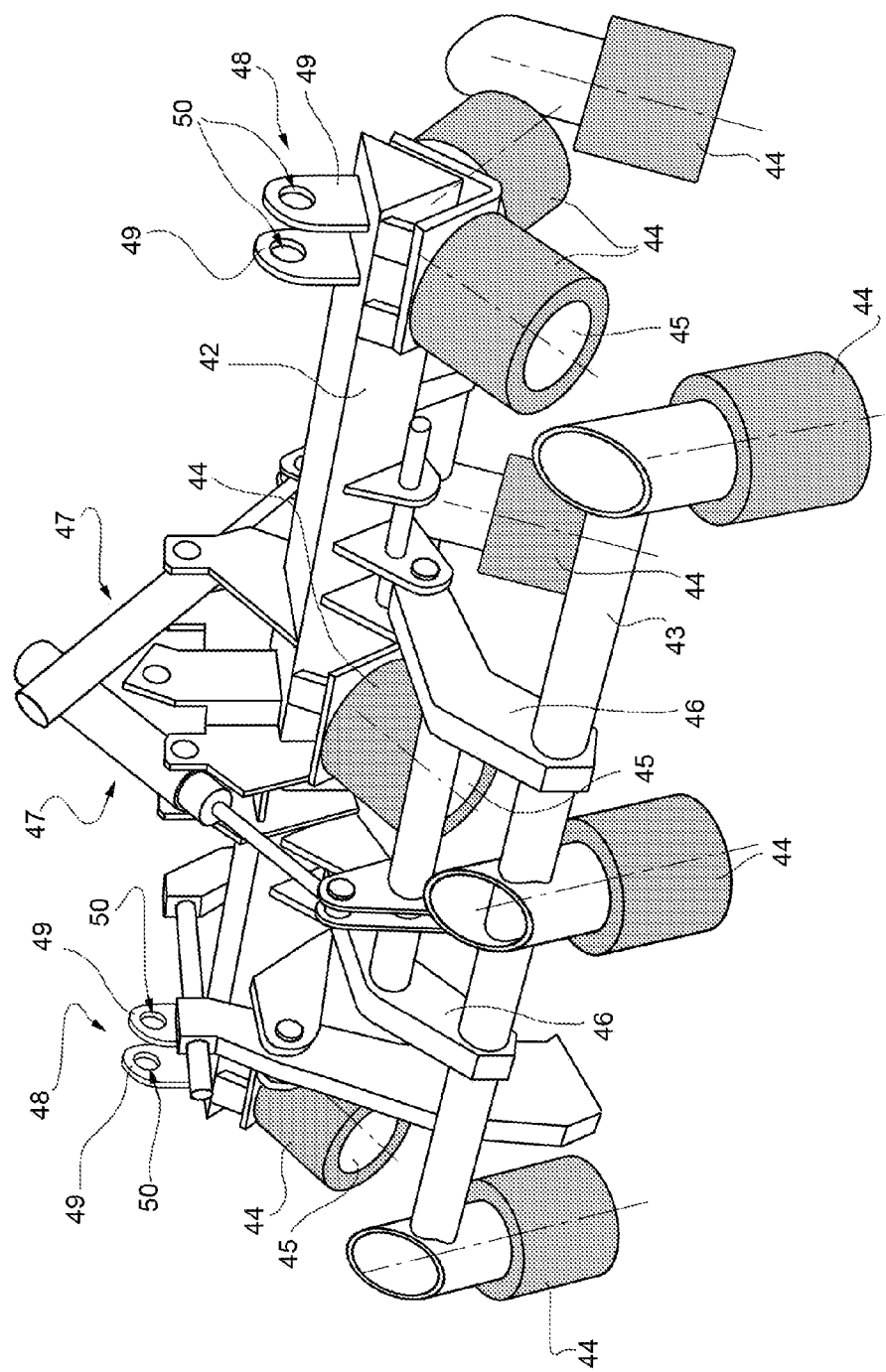
FIG. 10 shows a view in perspective, with parts removed for clarity, of the FIG. 9 trolley.

With reference to FIGS. 8, 9 and 10, frame 38 of trolley 36 comprises an elongated body 42; and two elongated bodies 43 parallel to, located on opposite sides of, and hinged to elongated body 42. Frame 38 comprises a plurality of powered rollers 44 fitted to elongated bodies 42 and 43.

In a variation (not shown in the drawings), some of the rollers are powered, and others are idle.

In certain embodiments, each powered roller 44 has a motor 45 located in the hub of powered roller 44. Motor 45 may be electric, hydraulic or pneumatic and powered by cables from laying vessel 5 (FIG. 1). In certain embodiments, powered rollers 44 are cylindrical, and are arranged so as to roll along pipeline 2 with their axes perpendicular to axis A1 of pipeline 2. Elongated body 42 supports two sets of powered rollers 44, the axes of rotation of which form an inverted 'V', and which are configured to contact the top of the pipeline (FIG. 8); and each elongated body 43 supports one set of powered rollers 44, which are selectively movable and also act as grip rollers.

Each elongated body 43 is connected to elongated body 42 by at least one curved arm 46, which is hinged to elongated body 42 about an axis parallel to elongated bodies 42 and 43 and located close to elongated body 42. Trolley 36 also comprises two actuators 47 fixed to elongated body 42 and to respective arms 46 to move elongated bodies 43 and relative powered rollers 44 between a release position and a closed position.

Frame 38 also comprises connecting members 48 fitted to the top of elongated body 42. In the example shown, connecting members 48 are flanges 49, each with a hole 50; and connecting members 41 each comprise a hole 51 formed in a respective plate 39.

In actual use, trolley 36 is fitted to the pipeline, and powered rollers 44 are all positioned contacting pipeline 2 to clamp trolley 36 to pipeline 2. Next, frame 35 is fitted to frame 38 by inserting the top of each plate 39 between two facing flanges 49 and aligning hole 51 with holes 50. And the two frames are then connected by inserting safety pins 52 inside holes 50 and 51.

The above operations are performed using a relatively small crane (not shown in the drawings) on board the laying vessel.

Float unit 34 and trolley 36 are also retrieved in two separate, successive stages.

Clearly, changes may be made to the embodiment described of the present disclosure without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pipeline guide system comprising:
  a float unit;
  a trolley selectively connectable to a pipeline which can span a designated path between a laying vessel and a bed of a body of water, said trolley being configured to roll along the pipeline, parallel to the designated path, to adjust a position of the float unit along the pipeline, said trolley including a plurality of grip rollers configured to roll along a bottom of the pipeline, said grip rollers being selectively movable between: (i) a release position, in which the pipeline is insertable between the grip rollers, and (ii) a closed position, in which the grip rollers are positioned contacting the pipeline, wherein each grip roller has a truncated-cone-shaped outer surface and is configured to rotate with respect to a respective arm about a first axis, said respective arm is configured to selectively rotate with respect to a frame of the float unit about a second axis parallel to said first axis; and at least one powered roller motor configured to drive a powered roller contacting the pipeline to adjust a distance between the float unit and the laying vessel.

2. The pipeline guide system of claim 1, wherein the at least one powered roller motor includes a reversible motor.

3. The pipeline guide system of claim 1, wherein the trolley includes a brake configured to act on the pipeline.

4. The pipeline guide system of claim 3, wherein the brake includes a pad configured to grip the pipeline.

5. The pipeline guide system of claim 1, which includes a drive on board the laying vessel, said drive including a winch connectable by a cable to the trolley, and a winch motor configured to drive the winch to decrease the distance between the float unit and the laying vessel.

6. The pipeline guide system of claim 1, wherein the frame of the float unit includes a compartment configured to house the trolley and the pipeline, and at least two seats located on opposite sides of said compartment, said at least two seats configured to house a plurality of floats.

7. The pipeline guide system of claim 6, wherein the trolley includes a further frame selectively connectable to the pipeline and the frame of the float unit.

8. The pipeline guide system of claim 7, wherein the further frame supports a plurality of additional powered rollers divided into a plurality of sets of aligned additional powered rollers, said sets of additional powered rollers configured to fit around the pipeline.

9. The pipeline guide system of claim 8, wherein the further frame includes a plurality of actuators configured to produce a relative movement between the sets of aligned additional powered rollers to selectively grip and release the pipeline.

10. The pipeline guide system of claim 8, wherein the frame of the float unit and the further frame include a plurality of respective connecting members configured to selectively connect the frame of the float unit to the further frame.

11. The pipeline guide system of claim 1, wherein the frame of the float unit is configured to rest stably on the bed of the body of water.

12. The pipeline guide system of claim 1, wherein the trolley includes a plurality of guide rollers configured to roll along a top of the pipeline.

13. The pipeline guide system of claim 12, wherein the guide rollers are selectively movable, based on a diameter of the pipeline, with respect to the frame of the float unit.

14. The pipeline guide system of claim 1, wherein the grip rollers remain within the confines of the frame of the float unit regardless of the respective positions of the grip rollers.

15. A pipeline guide system comprising:
a float unit including a frame including a compartment configured to house a trolley and a pipeline, and at least two seats located on opposite sides of said compartment, said at least two seats configured to house a plurality of floats;
the trolley selectively connectable to the pipeline which can span a designated path between a laying vessel and a bed of a body of water, said laying vessel including a drive having a winch connectable by a cable to the trolley, and said trolley being configured to roll along the pipeline, parallel to the designated path, to adjust a position of the float unit along the pipeline, wherein the trolley includes a further frame selectively connectable to the pipeline and the frame of the float unit, wherein said further frame supports a plurality of powered rollers divided into a plurality of sets of aligned powered rollers, said sets of powered rollers configured to fit around the pipeline, and said further frame includes a plurality of actuators configured to produce a relative movement between the sets of aligned powered rollers to selectively grip and release the pipeline; and
a winch motor connected to the trolley and configured to drive the winch to decrease a distance between the float unit and the laying vessel.

16. The pipeline guide system of claim 15, wherein the frame of the float unit and the further frame include a plurality of respective connecting members configured to selectively connect the frame of the float unit to the further frame.

17. The pipeline guide system of claim 15, wherein the frame of the float unit is configured to rest stably on the bed of the body of water.

18. A pipeline guiding method comprising:
selectively fitting a trolley of a float unit to a pipeline spanning a designated path between a laying vessel and a bed of a body of water, said laying vessel including a drive having a winch connectable by a cable to the trolley and said trolley including a plurality of grip rollers fitted to a frame of the float unit;
moving the grip rollers between a release position and a closed position within the confines of the frame of the float unit; and
utilizing a winch motor connected to the trolley to drive the winch to move the trolley, parallel to the designated path, along the pipeline to decrease a distance between the float unit and the laying vessel.

19. The pipeline guiding method of claim 18, further comprising adjusting the trolley based on a size of the pipeline.

20. The pipeline guiding method of claim 18, further comprising fitting the trolley to the pipeline, and then fitting the float unit to the trolley.

21. A pipeline guide system comprising:
a float unit;
a trolley selectively connectable to a pipeline which can span a designated path between a laying vessel and a bed of a body of water, said laying vessel including a drive having a winch connectable by a cable to the trolley, and said trolley being configured to roll along the pipeline, parallel to the designated path, to adjust a position of the float unit along the pipeline, wherein said trolley includes a plurality of guide rollers configured to roll along a top of the pipeline, the guide rollers being selectively movable, based on a diameter of the pipeline, with respect to a frame of the float unit; and
a winch motor connected to the trolley and configured to drive the winch to decrease a distance between the float unit and the laying vessel.

22. A pipeline guide system comprising:
a float unit;
a trolley selectively connectable to a pipeline which can span a designated path between a laying vessel and a bed of a body of water, said laying vessel including a drive having a winch connectable by a cable to the trolley, and said trolley being configured to roll along the pipeline, parallel to the designated path, to adjust a position of the float unit along the pipeline, wherein said trolley includes a plurality of grip rollers configured to roll along a bottom of the pipeline, said grip rollers being selectively movable between: (i) a release position, in which the pipeline is insertable between the grip rollers, and (ii) a closed position, in which the grip rollers are positioned contacting the pipeline; and a winch motor connected to the trolley and configured to drive the winch to decrease a distance between the float unit and the laying vessel.

23. The pipeline guide system of claim 22, wherein the grip rollers remain within the confines of a frame of the float unit regardless of the respective positions of the grip rollers.

24. The pipeline guide system of claim 22, wherein each grip roller has an outer surface and is configured to rotate with respect to a respective arm about a first axis, said respective arm is configured to selectively rotate with respect to a frame of the float unit about a second axis parallel to said first axis.

\* \* \* \* \*